E. B. STUART.
TYPEWRITING MACHINE.
APPLICATION FILED DEC. 13, 1918.
1,352,229.
Patented Sept. 7, 1920.
7 SHEETS—SHEET 1.
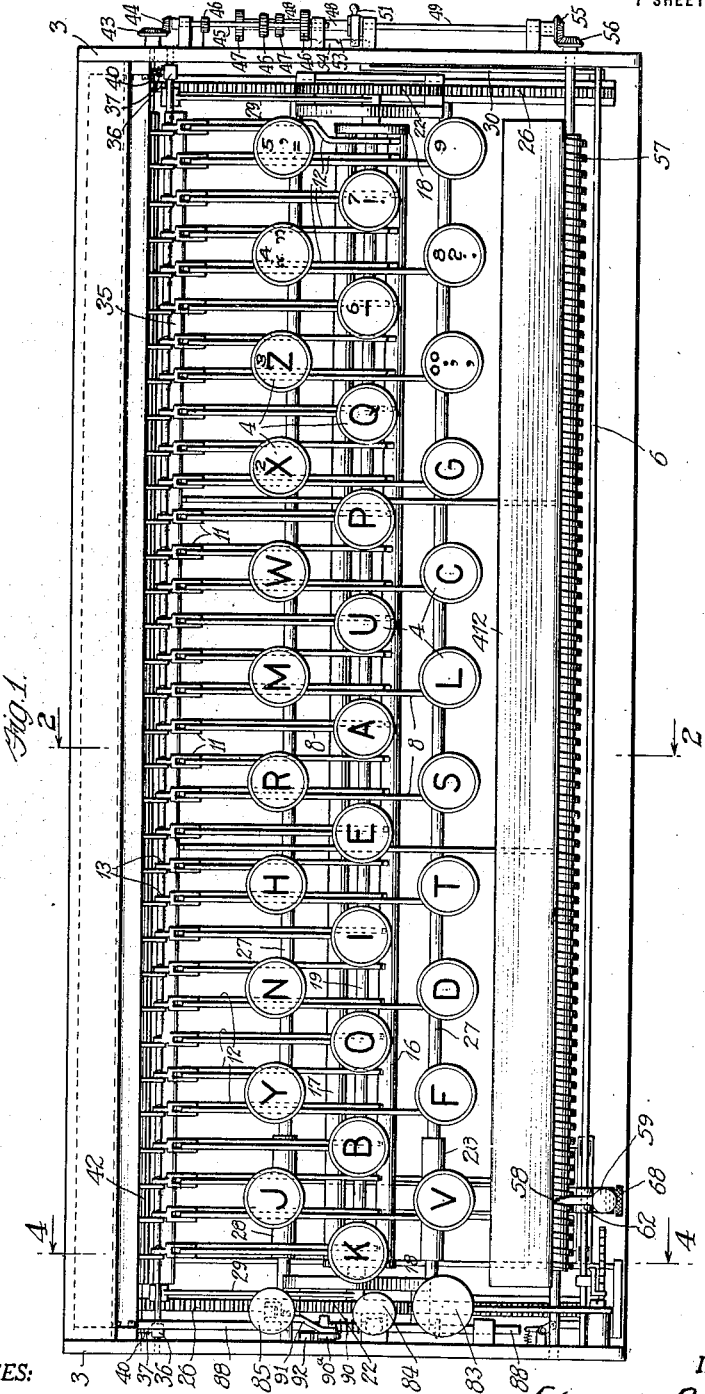
WITNESSES:
Martin H. Olsen.
INVENTOR.
Edwards B. Stuart
BY
Rummler & Rummler
ATTORNEYS.

E. B. STUART.
TYPEWRITING MACHINE.
APPLICATION FILED DEC. 13, 1918.
1,352,229.
Patented Sept. 7, 1920.
7 SHEETS—SHEET 2.
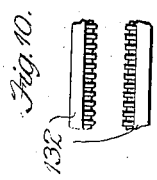
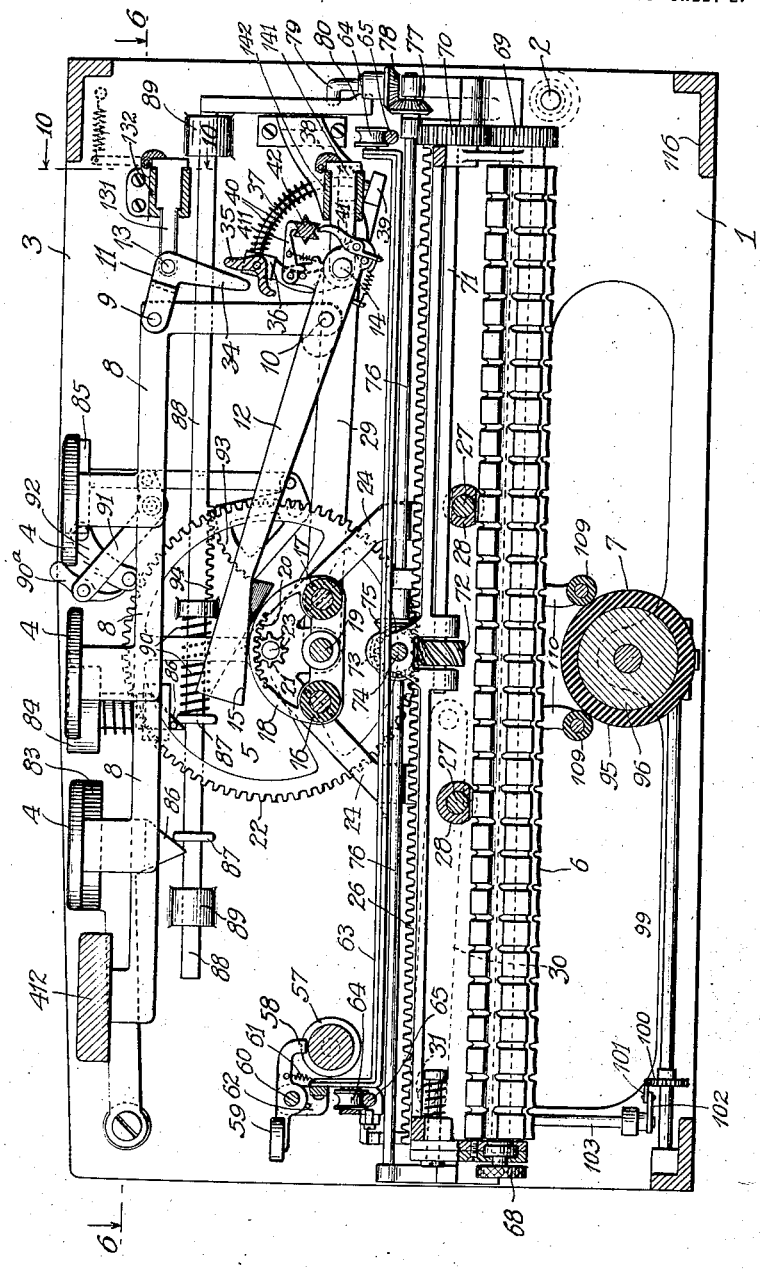
WITNESSES:
Martin H. Olsen.
INVENTOR.
Edwards B. Stuart.
BY
Rummler + Rummler
ATTORNEYS.

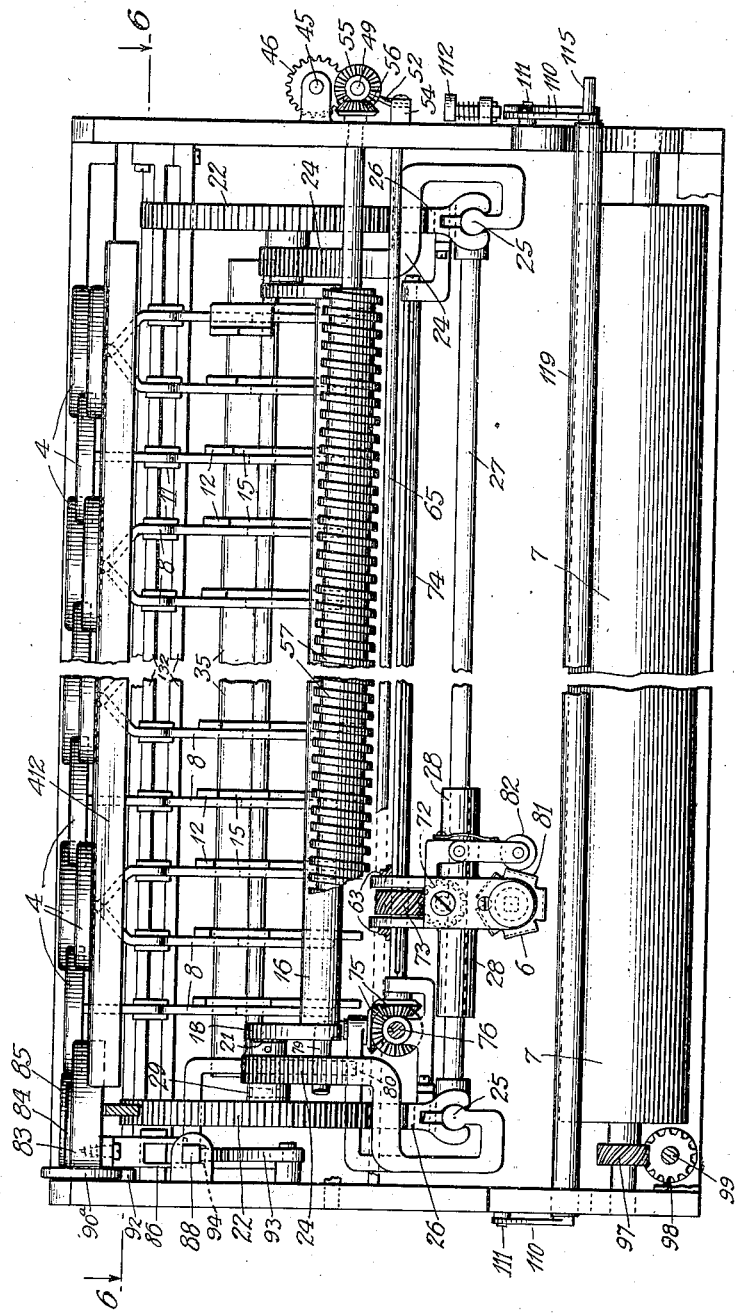

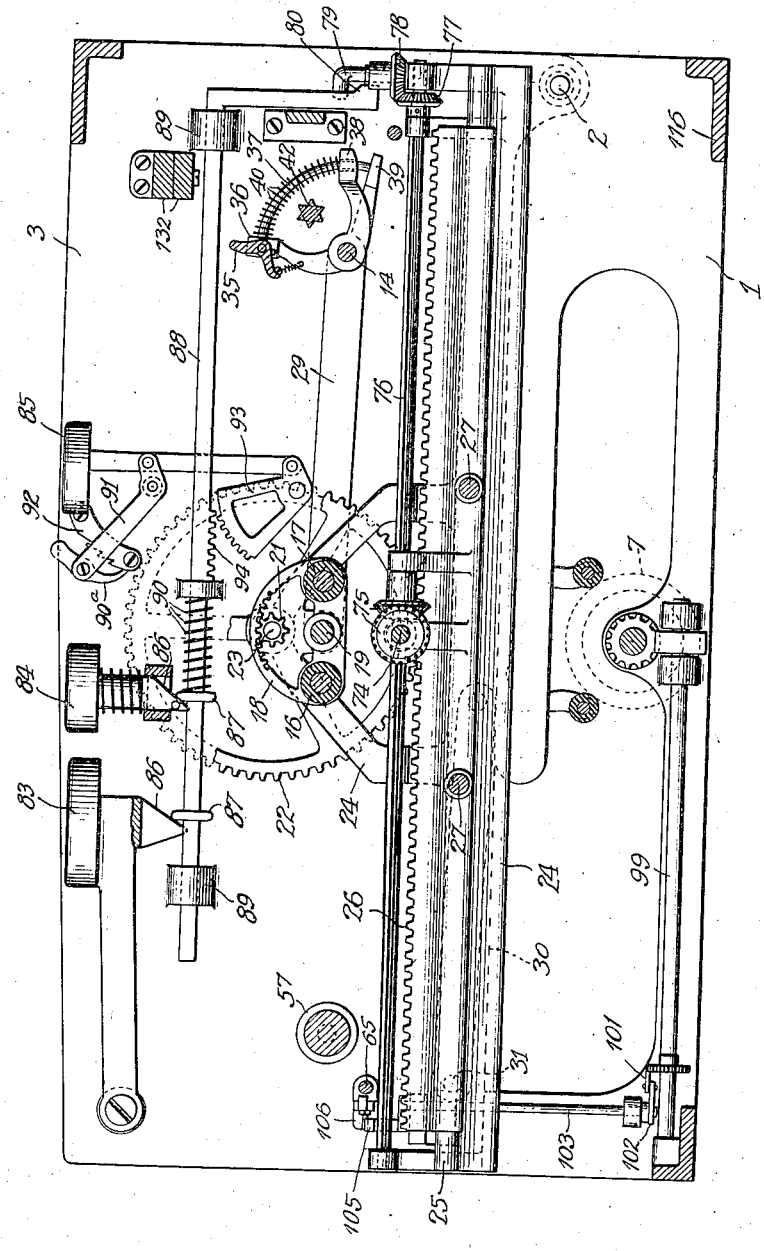

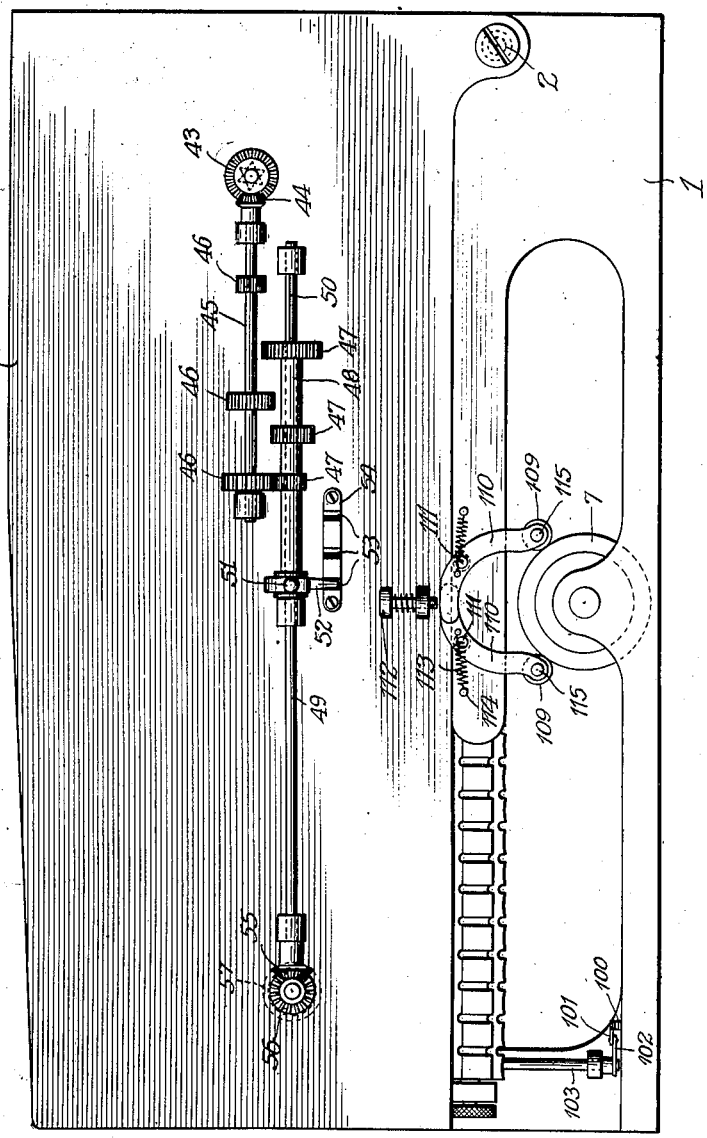

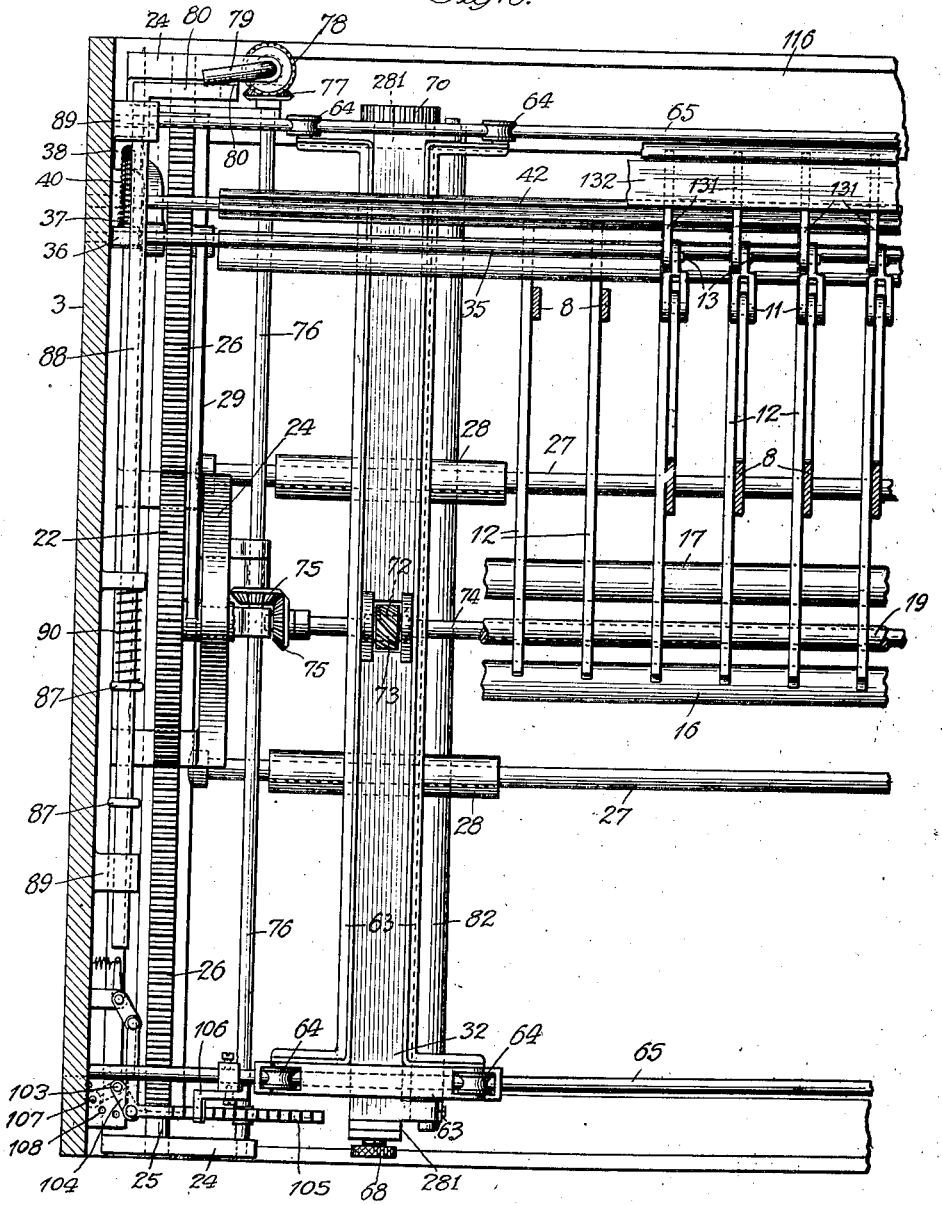

E. B. STUART.
TYPEWRITING MACHINE.
APPLICATION FILED DEC. 13, 1918.

1,352,229.

Patented Sept. 7, 1920.
7 SHEETS—SHEET 7.

WITNESSES:
Martin H. Olsen.

INVENTOR.
Edwards B. Stuart
BY
Cummuler + Cummuler
ATTORNEYS.

UNITED STATES PATENT OFFICE.

EDWARDS B. STUART, OF CHICAGO, ILLINOIS.

TYPEWRITING-MACHINE.

1,352,229.

Specification of Letters Patent.  Patented Sept. 7, 1920.

Application filed December 13, 1918. Serial No. 266,569.

*To all whom it may concern:*

Be it known that I, EDWARDS B. STUART, a citizen of the United States of America, and a resident of Chicago, county of Cook, and State of Illinois, have invented certain new and useful Improvements in Typewriting-Machines, of which the following is a specification.

The objects of this invention are to provide improvements in the construction and operation of typewriters, designed with a view to lightening the work required of an operator, and permit rapid successive operation of the keys. The arrangement provides that if the time interval between the depression of keys is extremely slight, the depression of a key will assist in restoring the key depressed on the preceding stroke. The construction includes improved means for differentially adjusting the type carrier and causing it to travel along the platen as the writing progresses; and improved spacing mechanism not requiring the depression of a space key upon printing such punctuation marks as commas and periods. The machine is so arranged that the paper may be entered directly to initial writing position without revolving the platen. It is also the purpose of the invention to modify the nature of the impact of the type with the platen to lessen noise and reduce unnecessary vibration. A further object of the invention is to provide a construction of typewriting machine which is easily assembled, small and light, yet strong, and has few parts which are likely to become bent or displaced in the normal operation of the machine: and to provide improved operating mechanism for differentially setting the type-carrier.

An illustrative embodiment of the invention is shown in the accompanying drawings, in which—

Figure 1 is a plan view of a typewriting machine constructed according to this invention.

Fig. 2 is a transverse vertical section taken on the line 2—2 of Fig. 1.

Fig. 3 is a front elevation, partly broken away.

Fig. 4 is a transverse vertical section taken on the line 4—4 of Fig. 1.

Fig. 5 is a view in elevation of the right-hand end of the machine.

Fig. 6 is a fragmentary plan view taken on the line 6—6 of Figs. 2 and 3.

Figure 7:
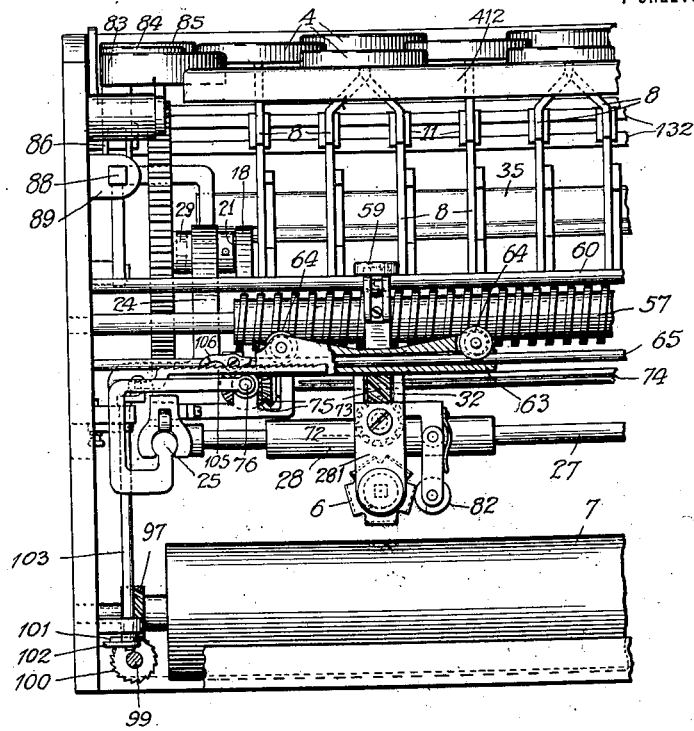
Fig. 7 is a fragmentary view in front elevation showing the type carrier carriage and line spacing mechanism operated thereby.
Figure 8:
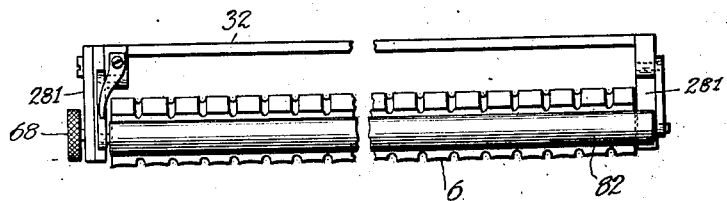
Fig. 8 is a side view of the type-carrier and inking roll.
Figure 9:
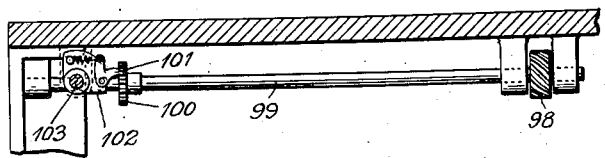
Fig. 9 is a detail view in plan of part of the line spacing mechanism.

Fig. 10, Sheet 2, is a sectional detail on line 10—10, Fig. 2.

Referring to general characteristics of the typewriting machine shown in the drawing:

The framework is formed of upper and lower sections which are hinged together at the rear in order to permit of easy access to the mechanism contained in the casing, and the paper. The platen and paper holding mechanisms are so arranged with respect to each other, that the paper may be passed on to the platen between two opposed rollers from the right hand side, enabling paper to be inserted in the position for writing without the necessity of turning the platen to force paper forward to position desired, and thereby also providing for a position on the table from which paper may be directly entered by pushing toward left. The keys, type carrier and type carrier adjusting mechanism are mounted in the upper section and the platen is located within the lower section. The type carrier is in the form of a cylinder extending over the platen from front to rear of the machine, the platen extending from side to side of the machine. The type carrier is rotatable for the purpose of bringing different sets of printing characters into operative position. Any one of the characters of a set is selected for an impression by shifting the type carrying cylinder differentially in the direction of its length, and a carriage which supports the type carrier is arranged to be shifted from left to right of the machine by a step-by-step motion during the writing of a line.

The lower platen supporting section 1 of the typewriter frame is shown in Fig. 5 as carrying pivot pins 2 around which the upper section 3 of the frame may be swung to permit convenient access to the mechanism in the lower part of the section 3. Fig. 2 shows the relative locations of the operating keys 4 and differential mechanism 5 for effecting the lengthwise adjustment or selection of characters on the type cylinder. The type cylinder 6 is shown extending from front to rear of the machine over and transversely to the direction of length of the platen 7.

The heads of the keys 4 are mounted on L-shaped bars 8 which are pivoted at 9 and 10 to bell crank levers 11 and arms 12 for differentially adjusting the type carrier 6. The bell crank levers 11 are pivotally mounted on studs 13 while the arms 12 are pivotally mounted on studs 14. With this construction, the head of a key 4 is maintained in true horizontal position during its depression.

The keys are spaced apart as desired, preferably by supporting pins 13 and 14 on separate blocks 131 and 141 which rest in rack constructions 132 and 142. The latter are serrated to receive teeth cast in the blocks 131 and 141 and retain the blocks in definite position.

For the purpose of differentially adjusting the type carrier in the direction of its length, the forward ends of arms 12 are formed with flat surfaces 15 on their lower edges, which extend at different angles and may engage horizontal, parallel cylinders 16 and 17 of a pivoted frame 18 and adjust it correspondingly. The frame 18 is pivotally mounted on a central bar 19 and when rocked from one angular position to another by engagement of the surface 15 of one of the arms 12 with the cylinders 16 and 17, upon the depression of a key, the frame is rocked either forwardly or rearwardly from its previous setting, to one corresponding with the angle formed by the surface 15 of the operated arm 12. The frame 18 at each end is provided with internal teeth 20 which mesh with a pinion 21 fast with gears or segment gears 22 journaled on short shafts 23. The bar 19 and the short shafts 23 are carried by a vertically movable frame structure 24. The frame 24 includes tracks 25, Fig. 3, along which are shiftable the racks 26 meshing with gears 22. The racks 26 are connected together by the bars 27 upon which the type cylinder supporting frame 28 is slidable. Motion of the racks, as received from the gears 22, effects the lengthwise adjustment of the type carrying cylinder 6 for the selection of different characters thereon, while for the purpose of spacing, the type carrier frame is adjustable along the rods 27.

The frame structure 24 which supports the gears 22 and racks 26, rods 27 and type carriage 28 thereon, is supported at the inner ends of two pairs of arms 29 and 30, Figs. 1, 2, 4, and 6. The arms 29 are pivoted in alinement with the studs 14, while the arms 30 are pivoted on studs 31 extending inwardly from the sides of the upper section 3 in the machine frame. When a key is depressed the frame 18 is given its desired angular adjustment to impart motion to the racks 26. The type supporting cylinder 6 and both its frame and the frame 24 are at the same time forced downwardly and thus cause the selected type of the type cylinder to make an impression. Upon the release of the key, the frame 24 and mechanism carried thereon are restored to normal position by springs 40 bearing against rearward extensions 38 of arms 29.

For the purpose of providing interference against too rapid successive depression of keys, and also to cause the depression of a key to assist in restoring a partly depressed or returning key, the arms 34 of bell crank levers 11, Fig. 2, engage and operate a pawl 35 which is universal to all of the bell crank levers 11.

The pawl 35 is a horizontal bar which in cross section is in the form of a bell crank lever. When the vertical arm of the pawl is engaged by one of the arms 34, the horizontal arm of the pawl rocks upwardly to the rear of the remaining arms 34. The pawl 35 not only has this rocking motion, but swings rearwardly and downwardly around studs 14. The pawl is pivoted to and connects the upper ends of a pair of arms 36. Curved rods 37 are rigid with the arms 36 and extend from their upper ends through rearward projections 38 of arms 29 and to rearwardly extending portions 39 of the arms 36. A spring 40 surrounds each rod 37 and is compressed between the arms 36 and 38. When the pawl 35 is rocked by the depression of a key and its horizontal arm is in the path of the arms 34 of the remaining bell crank levers 11, the depression of another key before the first one is fully released would result in forcing the pawl and its supporting arms 36 to swing to the right and compress the springs 40, but since these springs are already under more or less compression pawl 35 is first cammed back to normal position due to the shape of its horizontal arm and therefore speeds the return of the key upon which the operator exerts the lesser pressure.

For the purpose of effecting spacing of the type carrying cylinders with respect to the platen, each arm 12 carries a pawl 41 which, early in the stroke of the arm, engages one of the teeth of a star-shaped or pinion bar shaft 42 and slidably rotates the shaft. The shaft 42 is journaled at its ends in the frame structure 3 and extends through the right-hand side frame, where it carries a beveled pinion 43 meshing with a pinion 44 on shaft 45. This shaft carries a plurality of pinions 46 of different sizes for meshing with different pinions 47 on a sleeve 48. The sleeve is slidable along a shaft 49 and has a spline which engages a groove 50 in the shaft. The extent of angular rotation imparted to the shaft 49 depends upon which pair of pinions 46 and 47 is engaged. The sleeve 48 may be shifted along the shaft 49 by the arm 51 which is supported in a grooved collar rigid with the sleeve and has a tooth 52 which may enter one of the apertures 53 in a fixed bracket 54 and thus retain the sleeve in the desired position along the shaft 49. The shaft 49 at its forward end carries a beveled pinion 55 engaging a pinion 56 which is rigid with a threaded shaft 57. The thread on shaft 57 engages teeth 58 (Fig. 2) at the rear end of a key 59. This key is pivoted on a rod 60 and its teeth are normally held in engagement with the threaded shaft 57 by a spring 61. The object of pivoting the key is to provide means for disengaging its teeth from the shaft 57 and permitting a rapid motion of the type carrying bar 6 by shifting the key to the right or left along the rod 60. The key 59 is located between a pair of ears 62 rigid with a frame 63. This frame carries wheels 64 resting on rods or tracks 65. The frame is shifted along these tracks either by means of the key 59 or rotation of the threaded shaft 57 as received from the pinion rod 42 and adjustable gearing previously described. The frame 63 as shown in Fig. 7 has a depending part 32 extending into a fork 281 of the frame structure 28 which supports the type carrier. When frame 28 moves up and down under the action of writing keys, it does not become disengaged from frame 63 due to the sliding connection with depending part 32 of frame 63.

The punctuation keys are preferably not only provided with a pawl 41 but also a pawl 411, Fig. 2, so that an additional motion will be imparted to the tooth bar 42 on the up-stroke of the key and thereby make unnecessary a separate depression of a space key after the depression of a punctuation key.

The space bar 412 operates the toothed bar 42 and connected spacing mechanism the same as the letter keys but does not carry an arm 12 and therefore does not affect the setting of the type-carrier.

The type carrier or cylinder 6 carries a plurality of rows of type, which rows may be small letters, capital letters, italics, etc., five rows being illustrated in the drawings. The cylinder is rotatably mounted in its supporting frame and may be rotated to bring different sets of type into operative position either by the knurled head 68 or the gearing shown in Figs. 2, 3, and 4. This gearing comprises the gears 69 and 70, shaft 71, spiral gears 72 and 73, shaft 74, and the pair of beveled gears 75, shaft 76, and the beveled gears 77 and 78, Fig. 4. The gear 78 is rigid and rotatable with a bent bar 79 journaled in the frame 24 and coacting with an adjustable cam 80. Normally, when the frame 24 is forced downwardly at the time of taking an impression, the bent arm is turned far enough by engagement with the cam 80, to effect ½ rotation of the type carrier 6 and the set of type 81, Fig. 3, will wipe past the ink roller 82 and then rest above the platen before the selected type makes the impression. Assuming that this row of type 81 is a set of small type and that to effect an impression of a row of capitals it would be necessary to rotate the type cylinder twice the extent mentioned, the cam 80 is adjusted so as to double the throw of the bent rod 79. Adjustment of the cam is effected by the keys 83, 84, or 85, Fig. 4. When the key 83 is depressed, it will remain in its depressed position until pulled up by the operator, whereas when the key 84 is depressed, it will immediately return under spring action when released by the operator. Each of these keys is provided with an inclined cam shoulder 86 for engagement with the shoulders 87 on the horizontal bar 88 rigid with the cam 80. The bar 88 is slidable in bearings 89 and is restored to normal position when released by the spring 90. The key 85 is arranged to give to the bar 88 a greater throw than may be imparted to it by either of keys 83 or 84. This key may be locked in any one of a plurality of positions by the pawl 90ª which is mounted on the upper end of a bell crank lever 91 which supports the key, and the pawl coacts with a fixed tooth rack 92. The remaining bell crank lever 93 for assisting in supporting the key is in the form of a segment gear meshing with rack teeth 94 on the bar 88, and serves to transmit motion from the key to the bar.

Platen 7 is preferably formed of a hard incasing shell 95, Fig. 2, surrounding a cylinder 96 of soft rubber or other resilient material. The purpose of such construction is to provide a hard platen surface which will result in sharp and clean impressions, while at the same time being elastic and cushioning the impact of the type by moving as a whole against the softer inner core. The line spacing is effected by rotating the platen from the gears 97 and 98, Fig. 3 The gear 97 is fast to the inner cylinder 96 of the platen and the gear 98 is fast to a shaft 99, which, as shown in Fig. 7, carries a ratchet wheel 100. This ratchet wheel is rotated by a pawl 101 pivoted on an arm 102 at the lower end of a vertical shaft 103. At its upper end shaft 103 carries an arm 104, Fig. 6, to which is attached a tooth rack 105. This rack coöperates with a spring restorer driving pawl 106 slidable on shaft 65. When the type carrier carriage 28 is restored to the left hand side of the machine after the writing of a line, it engages pawl 106, causing the latter to impart motion to rack 105 and thereby through the gearing rotate the platen the distance of one line space. This distance may be varied as desired by adjusting the stop 107 into one or the other of the perforations 108 in a plate attached to the machine frame.

The paper rollers 109, Fig. 5, which hold the paper firmly against the platen are carried by arms 110, pivoted to the machine frame by pins 111. These arms may both be rocked to carry the rollers 109 away from the platen by means of the depressible key 112. When the restoring springs 113 pass below a center line between the centers of pivots 111 and pins 114, they will serve to retain the paper rollers 109 clear of the platen. The paper may then be inserted between the rollers and the platen from the right hand side of the machine. One of the rollers may be lifted independent of the other by means of the extensions 115 of their supporting shafts, as shown in Fig. 3.

In the operation of the machine, since the platen does not travel from side to side of the machine, the paper written upon remains in one position during the writing of a line, but at the completion of each line, when the type carrier is restored to the left side of the machine by means of the key 59, the platen is rotated a line space, feeding the paper toward the rear of the machine. By this means the paper is gradually fed out of the machine through the open space above the type carrier 116, Fig. 2. By the manipulation of the writing keys, the arms 12, Fig. 2, are successively depressed. Each of these arms has a surface 15, extending at the proper angle for the purpose of adjusting the type carrier into position for making an impression of the letter which the arm 12 and its actuating key represent. The downward motion of an arm 12 results in first actuating the space mechanism through the tooth bar 42. Further downward motion of the arm 12 causes its surface 15 to engage one or the other of the cylinders 16 and 17 and thereby to rock the frame 18 and rotate the gears 22. Since the gears 22 mesh with the racks 26, the type carrier will be adjusted lengthwise along its guide rails from its previous setting direct to the position for making an impression of the selected letter. Continued downward motion of the arm 12 results in frame 18 moving downwardly and carrying with it frame 24 and the type carrier 6 which is slidably supported in said frame, until the type carrier engages the paper on the platen. During the downward motion of the type carrier, it is given a part rotation, due to the arm 79 shown at the right of Fig. 2 engaging cam 80. This part rotation of the type carrier causes the selected type to wipe past the ink roller 82, Fig. 7, before making the impression. The motion through arm 79 is transmitted to the type carrier from gearing and splined shafts which admit of the type carrier moving from side to side of the machine and also in the direction of its length without unmeshing the gearing.

The letter spacing which is effected by means of the pawls 41 engaging the tooth rod 42 and which has a gear connection with the thread shaft 57 is of uniform extent with respect to the different letter keys but when such keys as punctuation keys are depressed, the rod 42 is rotated both on the down and up-strokes of the punctuation keys. This additional motion which is imparted to the rod 42 is effected by the pawls 411 carried by the punctuation keys only and makes unnecessary the depression of the space key at such times.

I claim:

1. A typewriting machine, comprising a stationary platen, a carriage arranged to travel over said platen from side to side thereof, a type-carrier supported in said carriage, said type-carrier being shiftable in said carriage in a direction transverse to the direction of travel of said carriage, and a plurality of type keys each arranged to differentially shift the type-carrier in said carriage and impart a step-by-step motion to said carriage.

2. A typewriting machine, comprising a platen, a type-carrier carriage, a type-carrier supported in said carriage, a rack supported on said carriage, a gear coacting with said rack for differentially shifting said carrier with respect to said platen, a pinion fixed on said gear, an oscillatory frame pivotally mounted on an axis extending longitudinally of said platen and having a gear segment coacting with said pinion, a shoulder carried by said frame and located on one side of said axis, and a plurality of key-operated levers having differentially inclined surfaces, each adapted to coact with said shoulder for shifting said frame.

3. A typewriting machine, comprising a platen, a type-carrier carriage, a type-carrier supported in said carriage, a rack supported on said carriage, a gear coacting with said rack for differentially shifting said carrier with respect to said platen, a pinion fixed on said gear, an oscillatory frame pivotally mounted on an axis extending longitudinally of said platen and having a gear segment coacting with said pinion, a pair of shoulders carried by said frame and located one on each side of said axis, and a plurality of key-operated levers having differentially inclined surfaces, each adapted to coact with one of said shoulders for shifting said frame and with the other for preventing overthrow.

4. A typewriting machine, comprising a platen, a type-carrier carriage, a type-carrier supported in said carriage, means for differentially reciprocating said carriage for the purpose of bringing selected type on the type-carrier to the printing point, said means comprising an oscillatory frame geared to said carriage, a plurality of levers for coacting with said frame, and keys for operating said levers, said frame and levers having differently inclined coacting surfaces.

5. A typewriting machine comprising a platen, a type-carrier carriage, writing keys, and connections between said writing keys and said carriage adapted upon depressions of keys to cause a step-by-step motion of said carriage with respect to the platen in one direction and a differential adjustment of the carriage transversely to said direction for the purpose of selecting type, said connections being also arranged to move the type-carrier toward the platen to effect an impression.

6. A typewriting machine, comprising a frame, a platen supported in said frame, a cylindrical type-carrier having a plurality of sets of different type extending axially along its surface, writing keys arranged to differentially adjust the type-carrier in the direction of its length with respect to the platen and for causing the type-carrier to move toward the platen after its differential adjustment, and coacting mechanism connected to said type-carrier and mounted on said frame and adapted to cause the rotation of said type-carrier during the movement of said carrier toward said platen.

7. A typewriting machine, comprising a frame, a platen supported in said frame, a cylindrical type-carrier having a plurality of sets of different type extending axially along its surface, writing keys arranged to differentially adjust the type-carrier in the direction of its length with respect to the platen and for causing the type-carrier to move toward the platen after its differential adjustment, coacting mechanism connected to said type-carrier and mounted on said frame and adapted to cause the rotation of said type-carrier during the movement of said carrier toward said platen, and means for adjusting said coacting mechanism so as to control the amount of rotation of said carrier.

Signed at Chicago this 9th day of December, 1918.

EDWARDS B. STUART.